US008180839B2

(12) United States Patent
Baynes, Jr. et al.

(10) Patent No.: US 8,180,839 B2
(45) Date of Patent: May 15, 2012

(54) METHOD, SYSTEM, AND COMPUTER PROGRAM PRODUCT FOR SYNCHRONIZATION OF SIMILAR DATA OBJECTS WITH EVENT INFORMATION

(75) Inventors: Robert W. Baynes, Jr., Redwood City, CA (US); Michael R. Gray, Foster City, CA (US); Tashana K. Landray, San Francisco, CA (US); Linus M. Upson, Redwood City, CA (US); Thomas E. Whittaker, Belmont, CA (US)

(73) Assignee: iAnywhere Solutions, Inc., Dublin, CA (US)

( * ) Notice: Subject to any disclaimer, the term of this patent is extended or adjusted under 35 U.S.C. 154(b) by 0 days.

(21) Appl. No.: 12/646,790

(22) Filed: Dec. 23, 2009

(65) Prior Publication Data
US 2010/0174679 A1 Jul. 8, 2010

Related U.S. Application Data

(63) Continuation of application No. 09/950,005, filed on Sep. 12, 2001, now Pat. No. 7,644,125.

(60) Provisional application No. 60/231,557, filed on Sep. 11, 2000.

(51) Int. Cl.
*G06F 15/16* (2006.01)
(52) U.S. Cl. ...................................... 709/206; 709/246
(58) Field of Classification Search .................. 709/206, 709/246
See application file for complete search history.

(56) References Cited

U.S. PATENT DOCUMENTS

| 5,602,993 | A | 2/1997 | Stromberg |
| 5,862,325 | A | 1/1999 | Reed et al. |
| 6,324,544 | B1 | 11/2001 | Alam et al. |
| 6,345,308 | B1 | 2/2002 | Abe |
| 6,415,298 | B1 | 7/2002 | Oesterer et al. |
| 6,415,317 | B1 * | 7/2002 | Yelon et al. ................... 709/205 |
| 6,421,737 | B1 | 7/2002 | Stone et al. |
| 6,466,941 | B1 | 10/2002 | Rowe et al. |

(Continued)

FOREIGN PATENT DOCUMENTS
EP 0 717 353 A2 6/1996
(Continued)

OTHER PUBLICATIONS

Cerami, Ethan, "Delivering Push", New York: McGraw-Hill, 1998.
(Continued)

*Primary Examiner* — Kristie Shingles
(74) *Attorney, Agent, or Firm* — Sterne, Kessler, Goldstein & Fox P.L.L.C.

(57) ABSTRACT

A computer-implemented method for receiving information at a first device is provided. The method includes storing a first data object on the first device in a first device-specific representation, receiving a batch of information in response to the first device transitioning from an off-line state to an online state, processing the modification event to recover the modification, updating the first data object based on the recovered modification, and transmitting an acknowledgement indicating that the modification event was successfully processed by the first device. The batch of information includes a modification event. The content of the batch was determined based at least on a state of data stored on the first device. The modification event was generated based on at least a modification made to a second data object stored at a second device in a second device-specific representation.

11 Claims, 12 Drawing Sheets

U.S. PATENT DOCUMENTS

| | | |
|---|---|---|
| 6,477,543 B1 | 11/2002 | Huang et al. |
| 6,505,200 B1 | 1/2003 | Ims et al. |
| 6,519,653 B1 | 2/2003 | Glass |
| 6,615,276 B1 | 9/2003 | Mastrianni et al. |
| 6,625,621 B2 * | 9/2003 | Tan et al. ............................. 1/1 |
| 6,625,639 B1 * | 9/2003 | Miller et al. .................. 718/106 |
| 6,636,873 B1 | 10/2003 | Carini et al. |
| 6,650,620 B1 | 11/2003 | Neogi |
| 6,694,336 B1 * | 2/2004 | Multer et al. ......................... 1/1 |
| 6,704,807 B1 | 3/2004 | Mathur et al. |
| 6,738,812 B1 | 5/2004 | Hara et al. |
| 6,789,257 B1 | 9/2004 | MacPhail et al. |
| 6,826,726 B2 | 11/2004 | Hsing et al. |
| 6,845,370 B2 | 1/2005 | Burkey et al. |
| 6,898,591 B1 | 5/2005 | Moon et al. |
| 7,032,011 B2 | 4/2006 | Woodard et al. |
| 7,117,271 B2 | 10/2006 | Haverstock et al. |
| 7,644,125 B2 | 1/2010 | Baynes, Jr. et al. |
| 2002/0032722 A1 | 3/2002 | Baynes, Jr. et al. |

FOREIGN PATENT DOCUMENTS

| | | |
|---|---|---|
| WO | WO 98/44695 | 10/1998 |

OTHER PUBLICATIONS

International Search Report, dated May 22, 2003, for PCT Appl. No. PCT/US01/28386, 2 pages.

Written Opinion, dated May 30, 2003, for PCT Appl. No. PCT/US01/28386, 2 pages.

International Preliminary Examination Report, dated Aug. 25, 2003, for PCT Appl. No. PCT/US01/28386, 3 pages.

Examination Report, dated Jul. 2, 2004, for UK Patent Appl. No. GB0305477.2, 1 page.

Examination Report, dated Oct. 13, 2009, for European Patent Appl. No. 01968787.0, 4 pages.

* cited by examiner

US 8,180,839 B2

METHOD, SYSTEM, AND COMPUTER PROGRAM PRODUCT FOR SYNCHRONIZATION OF SIMILAR DATA OBJECTS WITH EVENT INFORMATION

CROSS-REFERENCE TO RELATED APPLICATIONS

This application is a continuation of U.S. Non-Provisional application Ser. No. 09/950,005, "Method, System, and Computer Program Product For Synchronization Of Similar Data Objects With Event Information," filed Sep. 12, 2001 (now U.S. Pat. No. 7,644,125, issued on Jan. 5, 2010), which claims the benefit of U.S. Provisional Application No. 60/231,557, "Asynchronous Synchronization of Similar Data Objects by Exchanging Event Information," filed Sep. 11, 2000, all of which are incorporated by reference herein in their entireties.

This patent application is related to the following U.S. utility patent applications, which are herein incorporated by reference in their entireties:

"Interactive Applications for Handheld Computers," Ser. No. 09/393,390, previously, filed on Sep. 10, 1999.

"System, Method, and Computer Program Product for Enabling On-Device Servers, Offline Forms, and Dynamic Ad Tracking On Mobile Devices," Ser. No. 09/559,964, filed on Apr. 28, 2000.

"System, Method, and Computer Program Product for Synchronizing Content Between a Server and a Client Based on State Information (As Amended)," Ser. No. 09/560,965, filed on Apr. 28, 2000.

"System, Method, and Computer Program Product for Administering Channels, Content, and Data for Mobile Devices," Ser. No. 09/559,965, filed on Apr. 28, 2000.

"System, Method, and Computer Program Product for Customizing Channels, Content, and Data for Mobile Devices," Ser. No. 09/560,957, filed on Apr. 28, 2000.

"System, Method, and Computer Program Product for Web Content Aggregation and Development, and Web Content Delivery to Clients," Ser. No. 09/560,956, filed on Apr. 28, 2000.

"System, Method, and Computer Program Product for Placement of Channels on a Mobile Device," Ser. No. 09/864,292, filed on May 25, 2001.

"Interactive Advertisement Mechanism on a Mobile Device," Ser. No. 09/864,293, filed on May 25, 2001.

"System, Method, and Computer Program Product for a Scalable, Configurable Client/Server, Cross-Platform Browser for Mobile Devices," Ser. No. 09/705,927, filed on Nov. 6, 2000.

"System, Method, and Computer Program Product for Executing Scripts on Mobile Devices," Ser. No. 09/754,256, filed on Jan. 5, 2001.

"System, Method, and Computer Program Product for Server Side Processing in a Mobile Device Environment," Ser. No. 09/705,914, filed on Nov. 6, 2000.

"System, Method and Computer Program Product for Customizing Channels, Content, and Data for Mobile Devices," Ser. No. 09/892,482, filed on Jun. 28, 2001.

"System, Method and Computer Program Product for Syncing to Mobile Devices," Ser. No. 09/897,607, filed on Jul. 3, 2001.

BACKGROUND OF THE INVENTION

1. Field of the Invention

The present invention relates generally to mobile communications, and more particularly relates to technology for synchronizing data with mobile devices.

2. Related Art

Over the past few years, there has been a large growth in the number of hand-held computers, personal digital assistants (PDA), and other mobile devices. In addition, there has been a marked increase in the number of ways for mobile devices to connect to the global Internet and the World-Wide Web (WWW), corporate internets, intranets, and other networks. This collective expansion allows users of mobile devices to access various types of information, disseminate information, and be exposed to electronic commerce (e-commerce) activities, all with a greater degree of freedom. E-commerce includes entities such as large corporations, small businesses, individual entrepreneurs, organizations, and the like who offer their information, products, and/or services to people all over the world via these networks.

The rise in use of mobile devices, however, also presents users, particularly users of more than one device, computer, or part of a company or group which uses such devices, with the problem of keeping their information contemporary and continuous. Various synchronization techniques have been developed to convey information from a computer or server to a mobile device and from the mobile device to the computer or server. However, these techniques do not provide the dynamic mobility required by users of one or more mobile devices connected to one or more networks.

Increasingly, the users of mobile devices have more than one mobile device, such as a cellular telephone and a personal digital assistant (PDA) the sharing of information among which benefits the user. In addition, corporations can have employees with more than one mobile device each, all of which require consistent information in order for the corporation to operate effectively.

Therefore, in view of the above, what is needed is a system, method and computer program product for the synchronization of similar data objects to one or more devices by exchanging event information. Similar data objects can include information requested or required by users of mobile devices. Event information can be constructed and exchanged by the system of the present invention. Further, what is needed is a system, method and computer program product that delivers event information to mobile devices based on information provided by one or more users.

BRIEF SUMMARY

A computer-implemented method for receiving information at a first device is provided. The method includes storing a first data object on the first device in a first device-specific representation, receiving a batch of information in response to the first device transitioning from an off-line state to an online state, processing the modification event to recover the modification, updating the first data object based on the recovered modification, and transmitting an acknowledgement indicating that the modification event was successfully processed by the first device. The batch of information includes a modification event. A content of the batch was determined based at least on a state of data stored on the first device. The modification event was generated based on at least a modification made to a second data object stored at a second device in a second device-specific representation.

In another embodiment, a computer system for receiving information at a first device is provided. The computer system includes, a storage for storing a first data object on the first device in a first device-specific representation, a module configured to receive a batch of information in response to the first device transitioning from an off-line state to an online state, a module configured to process the modification event to recover the modification, a module configured to update the first data object based on the recovered modification, and a module configured to transmit an acknowledgement indicating that the modification event was successfully processed by the first device. The batch of information includes a modification event. A content of the batch was determined based at least on a state of data stored on the first device. The modification event was generated based on at least a modification made to a second data object stored at a second device in a second device-specific representation.

In still another embodiment, a computer readable medium is provided. The computer readable medium carries one or more sequences of one or more instructions for execution by one or more processors to perform a method for processing memory requests, the instructions when executed by the one or more processors, cause the one or more processors to store a first data object on the first device in a first device-specific representation, receive a batch of information in response to the first device transitioning from an off-line state to an online state, process the modification event to recover the modification, update the first data object based on the recovered modification, and transmit an acknowledgement indicating that the modification event was successfully processed by the first device. The batch of information includes a modification event, a content of the batch having been determined based at least on a state of data stored on the first device. The modification event was generated based on at least a modification made to a second data object stored at a second device in a second device-specific representation.

These and additional features and advantages of the present invention will become more apparent from the detailed description set forth below when taken in conjunction with the drawings in which like reference characters generally identify corresponding elements throughout.

BRIEF DESCRIPTION OF THE DRAWINGS/FIGURES

The accompanying drawings, which are incorporated herein and form part of the specification, illustrate embodiments of the present invention and, together with the description, further serve to explain the principles of embodiments of the invention, as well as the structure and operation of various embodiments of the invention. The drawing in which an element first appears is generally indicated by the left-most digit(s) in the corresponding reference number.

DETAILED DESCRIPTION OF THE INVENTION

Figure 1A:
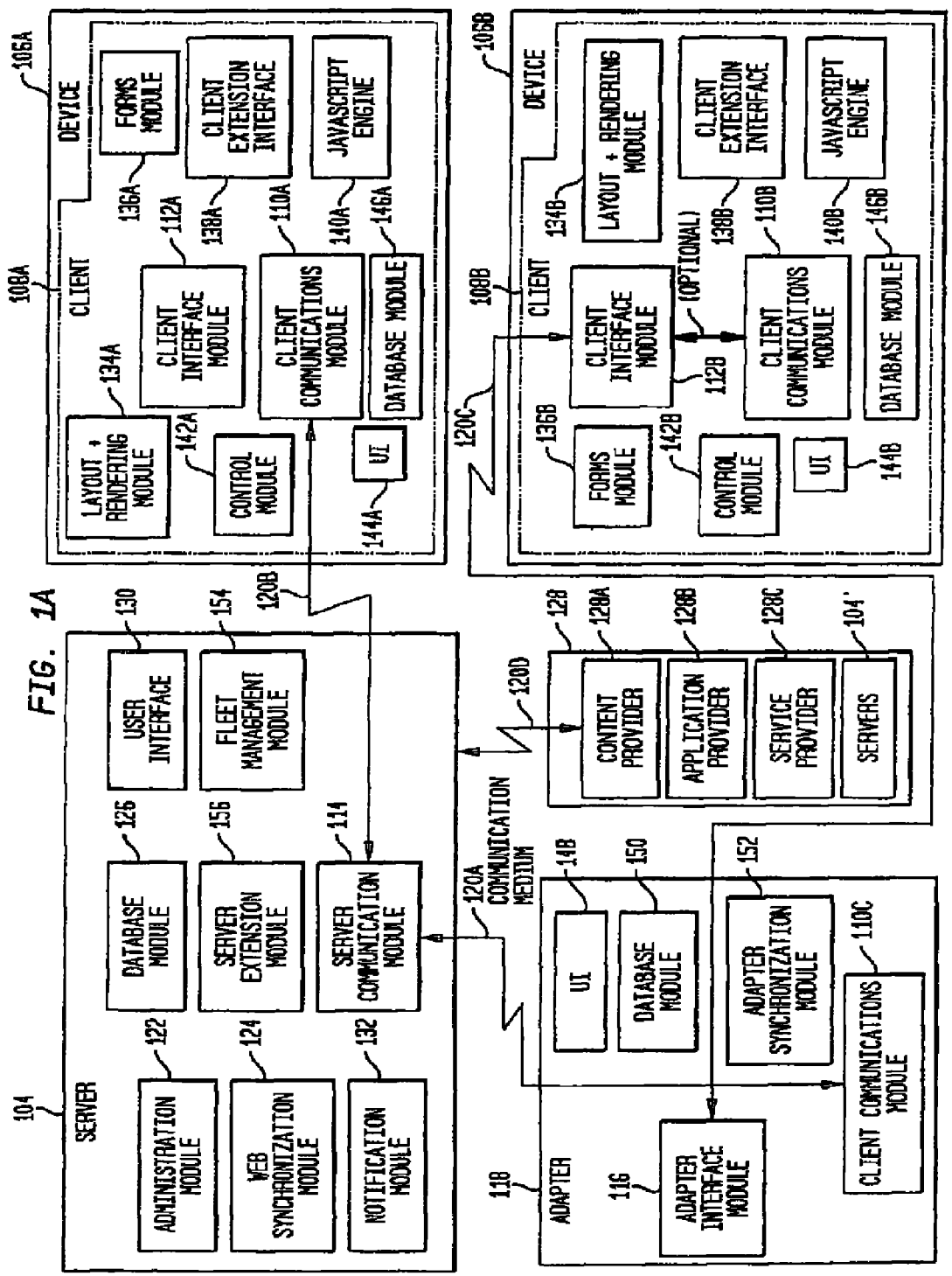
FIG. 1A is a block diagram of a computer architecture according to an embodiment of the present invention.

Overview of Embodiments of the Present Invention

The method, system, and computer program product of an embodiment of the present invention constructs different representations of an object as it is needed on the various components (e.g., mobile devices, computers, and servers) as modifications are made to each representation of that and/or similar objects on the different components accessible by the system.

For clarity only, and not to limit the scope of the present invention, the term representation is used to indicate any of a number of specified formats that an object can take based on the mobile device or other component upon which the object must both reside and be locally accessible. For example, a representation of a data object of a Microsoft® Word document on a personal computer (PC) is a Word file (most likely with a .doc file extension). However, a representation of a data object of a Microsoft® Word document on a PDA, such as a PocketPC or a Palm device, would be of a different file format. The object itself would contain the same information, and thus is a similar data object, as described throughout this specification, but the representation would be different. Representations can be format or standard specific, and as well as, in some embodiments, device or platform specific, and, as described herein, construction of representations is a feature of the present invention.

Additionally, for clarity only, and not to limit the scope of the present invention, the term instance is used to indicate the existence of a representation of an object on a device or system resource, such as a server, computer, or back-end data store. For example, a server of the present invention can construct and maintain more than one representation of an object from an instance of an object.

In one embodiment of the present invention, the system maintains information about the different representations of an object synchronized to one or more user devices as changes are made to each representation either by the user or on the user's behalf. The system achieves this by keeping track of modifications to the representation of an object, and communicating those changes in the form of events to all other instances of that object that are accessible by the system. In another embodiment of the present invention, the system constructs and stores modified instances of an object for later construction of different representations of the object.

Communicating the changes to all other instances is enabled by a dynamic mobile response to the available network. The changes flow from client or back end to all other clients and all other parts of the system via desktop synchronization, wireless synchronization, browsing or surfing via http, or via a push infrastructure. The disparate parts of the system including multiple mobile device platforms are unified by the dynamic response to the systems knowledge of the operating system so all aspects of the system, server to device, device to server, device to server to device, and device to device are enabled. All platforms of all devices can communicate additions, modifications, and updates to all platforms of all devices.

According to the embodiments of the present invention, World-Wide Web Consortium (W3C) recommended standards, which include, but are not limited to standards for hyper-text transfer protocol (HTTP), hyper-text mark-up language (HTML), extensible mark-up language (XML), and secure socket layer (SSL), can be used to in maintaining representations of similar objects across the various devices, device platforms, and networks.

According to one embodiment of the present invention, events can be generated to deliver new or changed representations of objects to one or more components connected to the system. In one embodiment, the event originates at the point where the change is first detected. For example, the event is generated by the system of the present invention when a change is detected on a user's handheld device or at a back-end server. As described in detail herein, the event is transmitted to one or more components of the system of the present invention, such as a controller on a server, or another of a user's devices. The devices receiving the events each contain representations of the object to be modified by the event or have settings to receive representations of the object. The modification or addition of the representation of the object can be performed by the structural features of the present invention, as described in detail below with regard to FIGS. 1A and 1B. According to embodiments of the present invention, the events can be transmitted over various media, such as over a wireless network, through a serial cable connected to a device cradle on a personal computer (PC), or via the Internet. When the modification event is received by the different parts of the system that contain representations of the modified object, that event is processed to update the representation of the object so that the information contained therein is updated.

As described herein, the objects can be represented in multiple instances on different components of the present invention. For example, an object that contains a name and phone number can be stored in a back-end database, in a cache on a server, and/or on a handheld device. When that object is modified the changes can be reflected in all representations of the object. Therefore if the phone number changes, that change can be communicated to the back-end database, the cache, and/or the handheld device, and reflected in all objects on the system that store the phone number (alternatively, in some embodiments, the change is reflected in a subset of the objects).

Structural Embodiments of the Present Invention

FIG. 1A is a block diagram of a data processing environment 102 according to an embodiment of the invention. The data processing environment 102 includes a server 104 (although only one server 104 is shown, in practice the data processing environment 102 may include a plurality of servers), one or more devices 106, one or more adapters 118, and one or more providers 128.

Generally, the server 104 maintains a collection of channels. In an embodiment, a channel comprises a collection of objects. An object is any entity that can be transferred to a client 108, such as but not limited to content, applications, services, images, movies, music, links, etc.

A channel includes a number of properties. At least some of these properties define the objects that the channel includes. Such properties include, but are not limited to, the following: 1) The name of the channel; 2) the location of a root object (such as but not limited to a URL). In an embodiment, this root object is included in the channel; 3) the indication of the number of levels below the root object, for which to include objects in the channel. For example, in an embodiment, if this property is equal to "1 level," then all objects that are 1 level down from the root object (reached by traversing links in the root object), are included in the channel. If this property is equal to "2 levels," then all objects that are 1 level down from the root object (reached by traversing links in the root object), and all objects that are 1 level down from those objects (reached by traversing links in those objects), are included in the channel. Embodiments of the invention allow "uneven" trees, where some branches of the tree extent to a greater number of levels than other branches of the tree. In other embodiments, the trees are even or balanced; 4) the maximum size of the channel. For example, if this is set to 500 Kbytes, then the aggregate size of the objects in the channel cannot be greater than 500 Kbytes. If the aggregate size of the objects in the channel is greater than this value, then embodiments of the invention may delete objects from the channel and/or delete portions of objects in the channel; 5) an indication of which resource objects are enabled for the channel; 6) an indication of whether or not images are to be included in or excluded from objects in the channel; 7) an indication of whether or not scripts are enabled in objects in the channel; and 8) a refresh methodology.

It is noted that the properties associated with channels may vary from implementation to implementation. Also, implementations may employ combinations of the above properties, and/or properties in addition to the following, as will be appreciated by persons skilled in the relevant art(s). For example, contact information, calendar information, memos, notes and other information transportable via the media described herein could form the contents or be used in place of the channels described herein.

The invention includes processes for managing channels, including but not limited to adding channels to the collection of channels maintained by the server 104.

The server 104 offers channels to clients 108. A client 108 may access the server 104 and view the collection of channels. The client 108 may then select any combination of the channels in the collection. The server 104 maintains a list of the channels associated with each of the clients 108.

During a synchronization process, the server 104 loads a device 108 with the channels associated with the client 108. Generally, the server 104 does this by obtaining from providers 128 the objects defined by the channels, and causing those objects to be stored on the client 108. Thus, during the synchronization process, the server 104 will load the client 108 with the selected channels. More particularly, the server 104 will load the client 108 with the objects associated with the channels.

The client 108 may process and use those objects when not connected to the server 104. The invention enables the client 108 to actively interact with the objects and channels.

In one embodiment, the client 108A directly interacts with the server 104 via some transmission medium 120B, which may be any wired or wireless medium using any communication protocol.

In another embodiment, the client 108B indirectly interacts with the server 104 via an adapter 118. For example, the client 108B may be a mobile device (such as a Palm device) and the adapter 118 may be a cradle and a computer coupled to the cradle (the mobile device is inserted into the cradle). In this instance, the adapter 118 presents itself to the server 104 as a client 108B (via client communications module 110C). When the server 104 sends objects to the adapter 118, the adapter interface module 116 writes those objects to client 108B. In embodiments, adapter interface module 116 can be a Hot Sync™ Manager, an Active Sync™, etc. It is noted that the invention is not limited to any of the implementation examples discussed herein.

The components shown in FIG. 1A shall now be described in greater detail.

The server 104 includes an administration module 122, a database module 126, a user interface 130, a web synchronization module 124, a server extension module 156, a fleet management module 154, a notification module 132, and a server communication module 114. Other embodiments of server 104 may include a subset of these modules, and/or may include additional modules.

The administration module 122 controls and manages the states of the server 104 and the clients 108. For example, the administration module 122 manages and controls groups of clients 108, permissions assigned to clients 108, groups, and channels. For example, the administration module 122 administers the users/clients 108 assigned to groups, and the channels associated with users. These and additional functions performed by the administration module 122 are described herein.

The database module 126 controls access to databases associated with the server 104. The database module 126 maintains information relevant to the clients 108, as well as information relevant to the modules contained in the server 104. The database module 126 manages information on the collection of channels maintained by server 104. These and additional functions performed by the database module 126 are described herein.

The user interface 130 is, in an embodiment, a graphical user interface (GUI) that enables users and clients 108 to access functions and modules offered by the server 104. More generally, the user interface 130 within server 104 provides access to server 104 and the modules and resources contained therein.

The invention supports various server web sites that are available through any communication medium, such as but not limited to the Internet, intranets, direct dial up links, etc. The UI 130 enables such web sites.

These and additional functions performed by the user interface 130 are described herein.

The web synchronization module 124 is an application/instance of server extension module 156, and controls synchronization of web content to client 108. The invention may include other synchronization modules (which are application/instances of server extension module 156) that control synchronization of other types of objects to clients 108. For example, the server 104 may administer a calendar that may be installed on clients 108. The synchronization of appointments, events and/or dates on this calendar between clients 108 and the server 104 may be performed by a calendar synchronization module. These and additional functions performed by the server extension module 156 are described herein.

The fleet management module 154 performs functions associated with fleets of clients 108, which are groups of clients 108. For example, fleet management module 154 may perform global or mass operations on groups (fleets) of clients 108, such as loading or updating an application on groups (fleets) of clients 108. Another example of a mass operation is retrieval of information on clients 108 in a fleet, such as the free memory in clients 108 in a fleet (this would help an organization determine if its clients 108 need a memory upgrade). These and additional functions performed by the fleet management module 154 are described herein.

The server extension interface/module 156 enables modules, such as third party modules, to operate in or work with the server 104 (and modules contained in the server 104). The server extension module 156 presents an API (application programming interface). Modules in the server 104 may operate with other devices in the server 104 by conforming to the server API.

For example, the web synchronization module 124 and the fleet management module 154 (as well as other types of synchronization modules, not shown in FIG. 1A) may interact with databases on the server 104 via the database module 126 by going through the server extension module 156. The web synchronization module 124 and the fleet management module 154 may not be able to interact directly with the database module 126 for a number of reasons. For example, they may support different data formats, or simply "speak different languages." However, they can interact via the server extension module 156 as well as other server modules as long as they conform to the API of the server extension module 156. This is true of any modules in the server 104, or that interact with the server 104.

Server communication module 114 enables communication between the server 104 and entities external to the server 104, such as clients 108, adapters 118, providers 128, work stations, etc. The server 104 communicates with these entities via communication mediums 120, which may be any type of wireless or wired communication using any protocol. It is noted that multiple server communication modules 114 may execute in a single server 104. For example, in one embodiment, server communication module 114 is a TCP/IP stack. In another embodiment, server communication module 114 is a secure socket layer stack or a compression stack. The invention is not limited to any implementation examples discussed herein. These and additional functions performed by the server communication module 114 are described herein.

The notification module 132 sends objects to clients 108 beyond objects related to channels associated with clients 108. Such objects could be requested by client 108 in advance. For example, a client 108 could ask for a notification when an event happens, such as when a stock reaches a target price. When the event occurs, the notification module 132 would cause an appropriate notification(s)/object(s) to be sent to the client 108. Alternatively, the notification module 132 may send objects to clients 108 without any prior explicit request from the client 108. For example, the notification module 132 might send channels to clients 108 when such channels are identified to be similar to those already selected by the clients 108. Also, the notification module 132 might send appropriate notifications/objects to the clients 108 when such clients 108 receive email or faxes at the server 104. In embodiments, the notification module 132 transmits such objects to the client 108 immediately when the event occurs, during the next synchronization with the client 108, or at some other future synchronization.

Figure 1B:
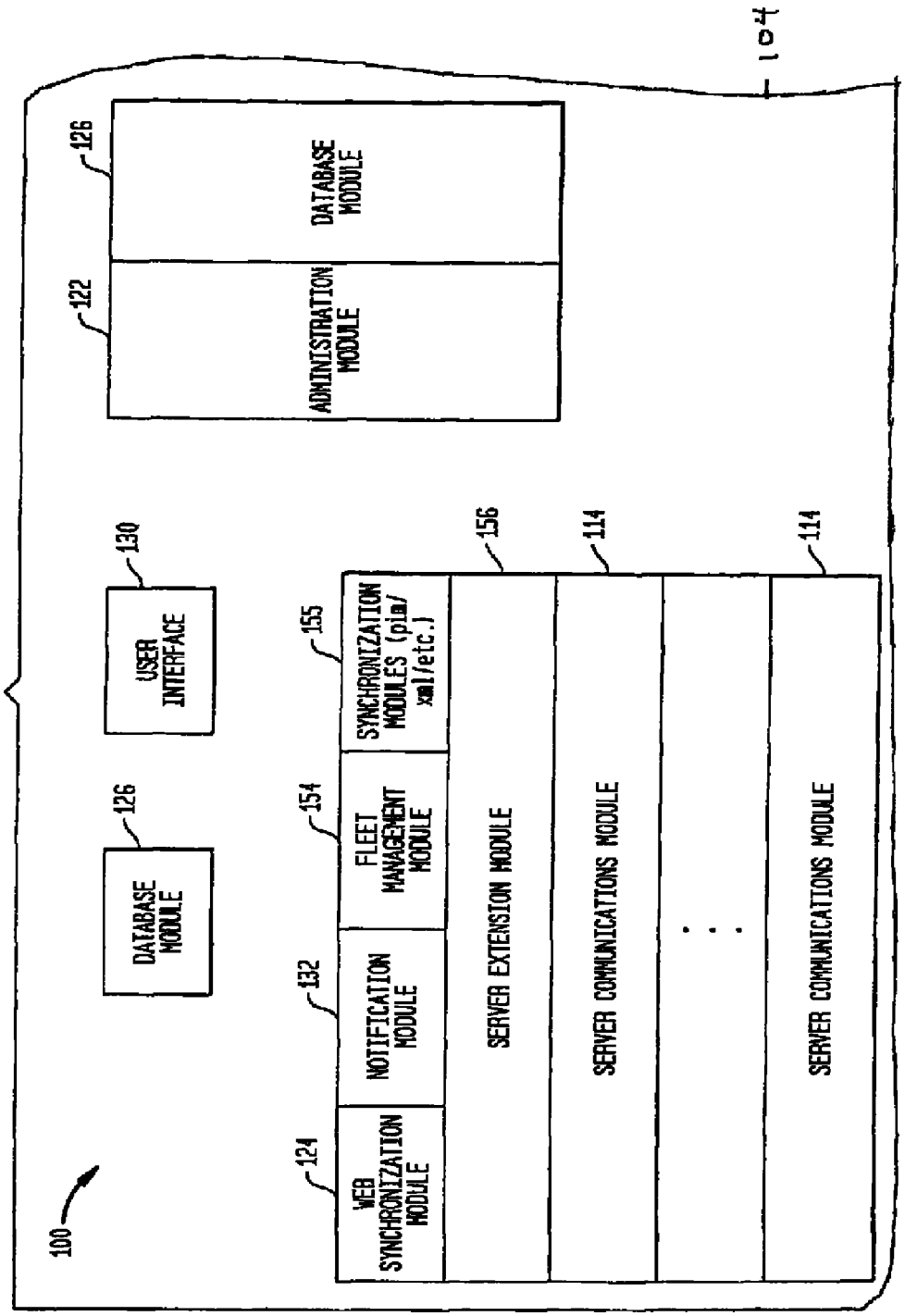
FIG. 1B is a block diagram of a computer architecture according to an another embodiment of the present invention.

An alternative representation of server 104 is shown in FIG. 1B. FIG. 1B illustrates, for example, that messages from entities outside of server 104 are received by server extension interface/module 156 via server communications modules 114. Generally, such messages represent requests for the server 104 to perform various functions. The server extension module 156 conceptually operates as a dispatcher who routes such messages to other modules contained in the server 104, such as web synchronization module 124 (who handles requests to synchronize with web content), notification module 132, fleet management module 154 (who handles fleet related requests), and/or third party modules 155 (such as other synchronization modules). Thus, the invention supports modules 155 generated by third parties to perform various functions. The modules 155 can be placed into communication with the server 104 via the server extension module 156.

Referring again to FIG. 1A, the devices 106 may be any type of data processing device. In embodiments of the invention, the devices 106 are mobile computing devices, although the invention is not limited to these embodiments. In such example embodiments, the devices 106 may include, but are not limited to, handheld computers, cellular phones, internet-enabled phones, pagers, radios, tvs, audio devices, car audio systems, recorders, text-to-speech devices, bar-code scanners, net appliances, mini-browsers, personal data assistants (PDAs), etc.

In embodiments of the invention, the devices 106 include software, hardware, and/or combinations thereof related to client functionality (such client functionality is described herein). When a device 106 includes such software, hardware, and/or combinations thereof, the device 106 is referred to herein as a client 108. Accordingly, it can be said that the data processing environment 102 includes one or more clients 108.

Clients 108 each may include a layout and rendering module 134, a forms module 136, a control module 142, a user interface 144, a client extension interface 138, a client interface module 112, a client communications module 110, a JavaScript™ engine 140, and a database module 146. Other embodiments of clients 108 may include a subset of these modules, and/or may include additional modules.

Layout and rendering module 134 can control the processing of data objects on client 108, such as the layout and rendering of data objects on client 108. For example, the layout portion of module 134 obtains information from databases of the client 108 (via the database manager 146) and determines where such information should be rendered on the display of the client 108. Such information may include anything that can be rendered, such as but not limited to images, text, links, etc. The rendering portion of module 134 is responsible for drawing items on the display (drawing bits to the screen). These and additional functions performed by the layout and rendering module 134 are described herein.

The forms module 136 controls and manages forms. For example, in embodiments the forms module 136 manages aspects of off-line forms, such as HTML forms and/or multi-page forms. The forms module 136 enables access to and user interaction with forms (in some embodiments, the forms module 136 via UI 144 enables users of client 108 to directly access forms). The forms module 136 maintains the status of forms. Forms module 136 can also include a forms manager (not shown) to provide added functionality. These and additional functions performed by the forms module 136 are described herein.

The user interface 144 is preferably a graphical user interface that enables users to interact with client 108 and functions and modules provided by the client 108. More generally, UI 144 controls how functions presented by modules of the client 108 are presented to users. The UI 144 controls how users interact with such functions and modules. It is noted that the functionality of the UI 144 may be distributed. For example, portions of the UI 144 may reside in the forms module 136, as well as other modules of client 108. These and additional functions performed by the user interface 144 are described herein.

The client extension interface 138 enables modules, such as third party modules, to operate in or work with the client 108 (and modules contained in the client 108). The client extension interface 138, also known as an on-device server, presents an API (application programming interface) that is, in embodiments, common to clients 108 on many architectures.

Modules in the client 108 can work together via the client extension interface 138. For example, the JavaScript™ engine 140 may decide that it wishes to display a message to the user. To do this, the JavaScript™ engine 140 would work through the client extension interface 138 to cause the UI 144 to display the message to the user. The JavaScript™ engine 140 may not know how to directly interact with the UI 144. However, as long as both the JavaScript™ engine 140 and the UI 144 conform to the API of the client extension interface 138, then they can operate together.

Similarly, the control module 142 may decide that it needs to store some data in a database. The control module 142 would do this by working with the client extension interface 138 to access the database module 146 to effect such a modification to the databases in the client 108. These and additional functions performed by the client extension interface 138 are described herein.

The JavaScript™ engine 140 executes objects written in the JavaScript™ language that operate on client 108. As noted, the JavaScript™ engine 140 conforms to the API of the client extension interface 138, and works with the client extension interface 138 to work with other modules in client 108. These and additional functions performed by the JavaScript™ engine 140 are described herein.

Although not shown in FIG. 1A, embodiments of the invention include other engines for executing other types of scripts on client 108. These other engines can interact with other modules on client 108 as long as the engines conform to the API of the client extension interface 138.

The database module 146 controls access to databases associated with client 108. More generally, the database manager 146 controls access to resources on the client 108. For example, the control module 142 may interact with the database manager 146 to open an address book in the databases, and to write a record to the address book. Alternatively, the forms module 136 can interact with the database module 146 to access forms that are stored in the databases. These and additional functions performed by the database module 146 are described herein.

Client communications module 110 enables the client 108 to interact with external entities, such as server 104. In embodiments, the client communications module 110 enables transmission control protocol/internet protocol (TCP/IP) traffic, although the invention is not limited to this example. More generally, the client communications module 110 enables communication over any type of communication medium 120, such as wireless, wired, etc., using any communication protocol, such as a pager protocol. These and additional functions performed by the client communications module 110 are described herein. The client interface module 112 enables the client 108 to communicate with adapters 118. Client interface module 112 optionally links to client communications module 110 in some embodiments to provide functionality (for example, when the client communications module 110 uses a wireless modem's drivers, which are accessed via client interface module 112). In embodiments, the client interface module 112 may be Hot Sync™ Manager in the Palm operating environment, or Active Sync™ in the Windows CE™ operating environment, or Pilot Link™ in the Unix operating environment. It is noted that these implementation examples are provided for illustrative purposes only. The invention is not limited to these examples. These and additional functions performed by the client interface module 112 are described herein.

The control module 142 coordinates the activities of the other modules in client 108 so that all the modules share resources properly. For instance, control module 142 can determine priorities for shared resources such as processing time, accessing memory, etc.

Providers 128 are sources of various types of objects, such as but not limited to content (content providers 128A), applications (application providers 128B), services (service providers 128C), etc. Providers 128 may also include servers 104' (similar to server 104), which may provide objects such as but not limited to content, applications, services, etc. For example, and without limitation, the application providers 128B may provide objects relating to (without limitation) operating system updates/changes, system upgrades, application updates/changes, etc.

Adapters 118 include an adapter interface module 116, a user interface 148, a database module 150, an adapter synchronization module 152, and a client communications module 110. Other embodiments of adapters 118 may include a subset of these modules, and/or may include additional modules.

Client communications module 110 is the same as similarly named modules in clients 108.

The adapter interface module 116 enables the adapter 118 to communicate with clients 108.

The adapter synchronization module 152 is involved with synchronization operations between server 104 and clients 108.

The UI 148 enables users to interact with modules and functions of adapter 118.

The database module 150 controls access to databases associated with adapter 118. The database module 150 manages information needed for clients 108 to remain in sync with server 104. In some embodiments, the adapter 118 does not include the database module 150 or the UI 148 (i.e., in embodiments where the adapter 118 operates essentially as a pipe, as in some embodiments on UNIX).

These and additional function performed by modules of the adapter 118 are described herein.

Overview of Dynamic Mobility

As described above, dynamic mobility involves the management of a user's information among the various devices or system components coupled thereto. With respect to FIGS. 1A and 1B, the synchronization of objects, such as data objects, can be done as channel synchronizations. Additionally, objects can be requested and delivered while a device is coupled to the components of FIGS. 1A and 1B, using the same components, but in a real-time manner (generally by employing "surf" and/or "push" approaches). These two modes of communication (it could also be viewed as three modes of communication: sync, surf, and push) form part of the dynamic mobility of the present invention. When combined with the event modification and processing features as described herein, the present invention provides the aforementioned dynamic mobility.

By way of introduction, the combination of these modes of communication is described briefly here, and in detail, with regard to the embodiments, below. First, the periodic delivery of objects, also known as synchronization, either as channels or individually, as one skilled in the art would be able to deliver based on the teachings herein, is described above with regard to FIGS. 1A and 1B. Synchronization accomplishes the goal of providing new and updated information to devices when they are coupled to the components of the present invention (via any medium, including wired and wireless mediums). For example, when a user places a PDA into a cradle, and activates a synchronization process between the device and the server 104 of the present invention. This form of modification and delivery is advantageous in circumstances where the amount of data is large and thus the amount of time required to deliver the objects is long enough that the generally faster delivery methods of synchronization becomes favorable.

Second, the delivery-on-request mode of communication, also known as surf, can be described as a limited and presently-coupled (or on-line) version of synchronization. Surfing entails the delivery of one or more objects based on an explicit request for those one or more objects by a device or component of the system or the user. In embodiments, surf differs from synchronization in that synchronization is performed once a request for all pending updates (or a collected or accumulated set of pending updates) is received from a device or component. Surf can be used when the user or system component only requires a specific object or objects, and thus makes a request for only those objects.

Third, the immediate delivery of events can be called the push mode of communication, where the modification of an object results in the construction of events that are delivered to devices and components of the system as such events are created. The push mode of communication is described in greater detail below, along with a more detailed discussion of the embodiments involving interrelation or selection of one or more of the modes by a device or group of devices.

Sync and surf are described also in the applications referenced above, such as but not limited to "System, Method, and Computer Program Product for Synchronizing Content Between a Server and a Client Based on State Information (As Amended)," Ser. No. 09/560,965, and "System, Method and Computer Program Product for Syncing to Mobile Devices," Ser. No. 09/897,607. Push is also described in the applications above, such as but not limited to "System, Method, and Computer Program Product for Placement of Channels on a Mobile Device," Ser. No. 09/864,292, and "Interactive Advertisement Mechanism on a Mobile Device," Ser. No. 09/864,293.

According to the embodiments of the present invention described herein, the features of dynamic mobility include, but are not limited to:

1) Seamless transition between the modes of communication such that devices can receive events using the modes either available to it or preferred by it or the user(s) or administrator of the system;

2) Availability of event delivery to one or more component devices regardless of the platform of the one or more component devices, such as PocketPCs, Palm devices, WindowsCE devices, Personal Computers (PCs), etc.;

3) Independence from communication medium itself, such that all of the communication modes and the combination or sub-combinations of the modes of the communication can operate over and/or through any number of networks or media; and 4) Flexibility in the protocol and standards employed to generate/construct and forward events, including modification events, such as, but not limited to: multipurpose internet mail extensions (MIME), HTML, SSL delivered events, TCP/IP and universal datagram protocol (UDP) delivered events, HTTP and hyper-text transfer protocol with security/encryption (HTTPS) delivered events, JavaScript™, XML, C, Basic, and C++.

Embodiments within a Data Processing Environment

Figure 2A:
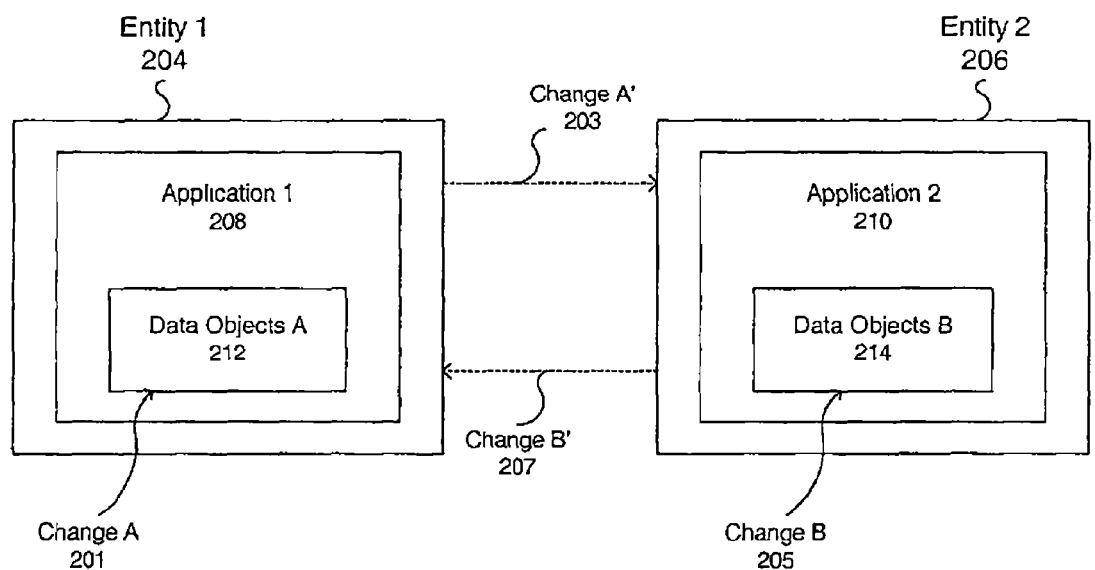
FIG. 2A is a block diagram illustrating the delivery of changes between entities of the system according to an embodiment of the present invention.

The invention shall be described by first considering a data processing environment shown in FIG. 2A. Data objects A 212 and data objects B 214 can be of any type X. As discussed elsewhere herein, X is the specific format in which the data object is represented. The representation of data objects can differ according to entity configuration details, while the data is the same or similar.

For example, and without limitation, the data objects can be spreadsheets, documents, images, audio, video, email, etc., and the underlining data can be weather, stock quotes, traffic, movie schedules, TV listings, property listings, loan rates, news, etc., and the source of the data objects can be a particular newspaper, a particular web site, a particular company, etc. Additional properties can be included within the representation of the data object.

In the example of FIG. 2A, data objects A 212 are shown as being processed by Application 1 208 in Entity 1 204, and data objects B 214 are shown as being processed by Application 2 210 in Entity 2 206. In an embodiment, an entity is any data communication and/or data processing device. In practice, both Applications 1 and 2 can be contained in the same entity or in different entities as is the case shown in this embodiment. Applications 1 and 2 can be the same (especially in the case where Entities 1 and 2 are different), similar, or different. In other words, Applications 1 and 2 can be any applications that are capable of processing, accessing, or otherwise supporting or interacting with data objects of data object type X.

Here, a Change A 201 is made to data objects A 212. Also, a Change B 205 has been made to data objects B 214. These changes can be been made in any manner. For example, and without limitation, they can be made by actions that the user took while working with Application 1 208, or they could have been made via receipt by Application 1 208 of some object or objects (such as receiving information over the Internet).

In an embodiment, data objects A 212 and data objects B 214 are representations of the same object. For example, and without limitation, data objects A 212 and data objects B 214 may be representations of a user's calendar. Entity 1 204 can be the user's PDA and Entity 2 206 can be the user's PC. In an embodiment, the user would like both representations of his calendar to be the same. Thus, the user would like any changes to data objects A 212 to also be made to data objects B 214, and vice versa. This is represented by change A' 203 and change B' 207.

The invention is directed to a method involving sets of representations of data objects, where changes made to some of the objects are also made to the other objects. According to one embodiment of the invention, when a change is made to some of the objects, one or more events are generated that cause similar and/or related objects to be similarly modified, regardless of upon which entity they reside. Such events may be any communication object, such as but not limited to interrupts, email messages, pointers, strings, JavaScript™ scripts and/or applets, etc. In an embodiment, the generation and distribution of such events can occur without any user interaction, such that continuity of the data is maintained on behalf of a user in a manner transparent to the user (i.e., the push mode of communication). The user could alternatively request an update for specific objects (surf), or request a processing of all pending updates (sync). Thus, a request can be send from one entity for the delivery of objects to another entity.

Figure 2B:
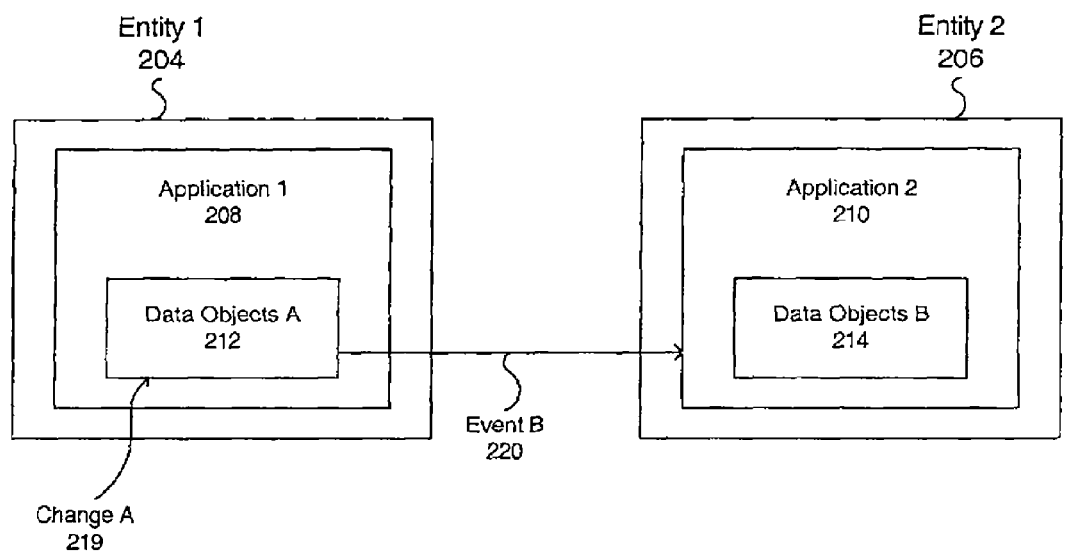
FIG. 2B is block diagram illustrating the delivery of an event in response to a change between entities of the system according to an embodiment of the present invention.

This embodiment of the invention is shown in FIG. 2B, where an Event 220 is generated and communicated to Application 2 210 relating to Change A 219 made to Data Objects A 212. Event 220 can instantiate data object 212 in Application 2 210 or modify the existing representation of data object 212 in Application 2 210. In addition Application 2 210 can be previously networked or newly networked, and, in either case, representations of data objects 212, 214, and others (212 and 214 represent instances of other data objects) are updated between Application 1 208 and Application 2 210 via this embodiment.

Figure 3A:
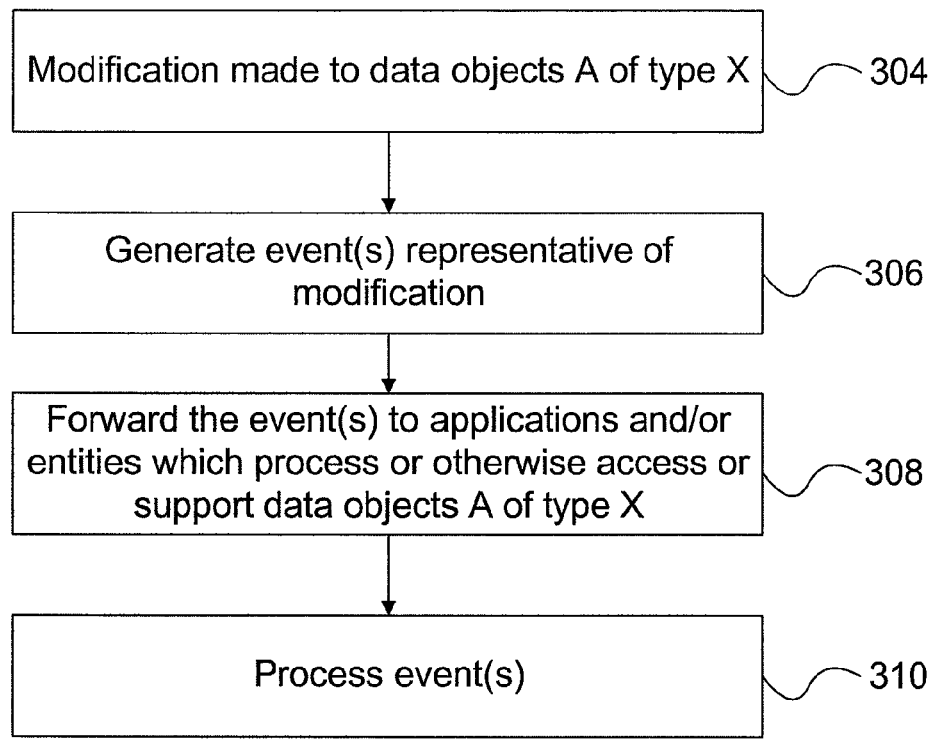
FIG. 3A is a flowchart relating to an embodiment of modification and delivery of data objects.

FIG. 3A is a flowchart 302 showing the operation of the invention according to an embodiment. In step 304, a modification is made to Data Objects A of Type X.

In step 306, one or more events are generated that are representative of this modification. In an embodiment, such events are implemented as email messages. Information regarding the modification is stored in the body or as an attachment to the email messages.

In step 308, the events are communicated ("pushed") to other applications and/or other entities that process, access, support, or otherwise interact with data objects of Type X. In some embodiments, it may be necessary for such applications/entities to have previously been registered so as to receive such events. In one embodiment where the events are email messages, such messages are emailed to such entities/applications. The events can be communicated via any communications medium accessible to the entities/applications.

In step 310, the events are processed by the recipients of the events. For example, in the case where the events are email messages, the application would receive the email. Upon parsing through the email message, the application can modify the data objects as indicated by the event.

Figure 3B:
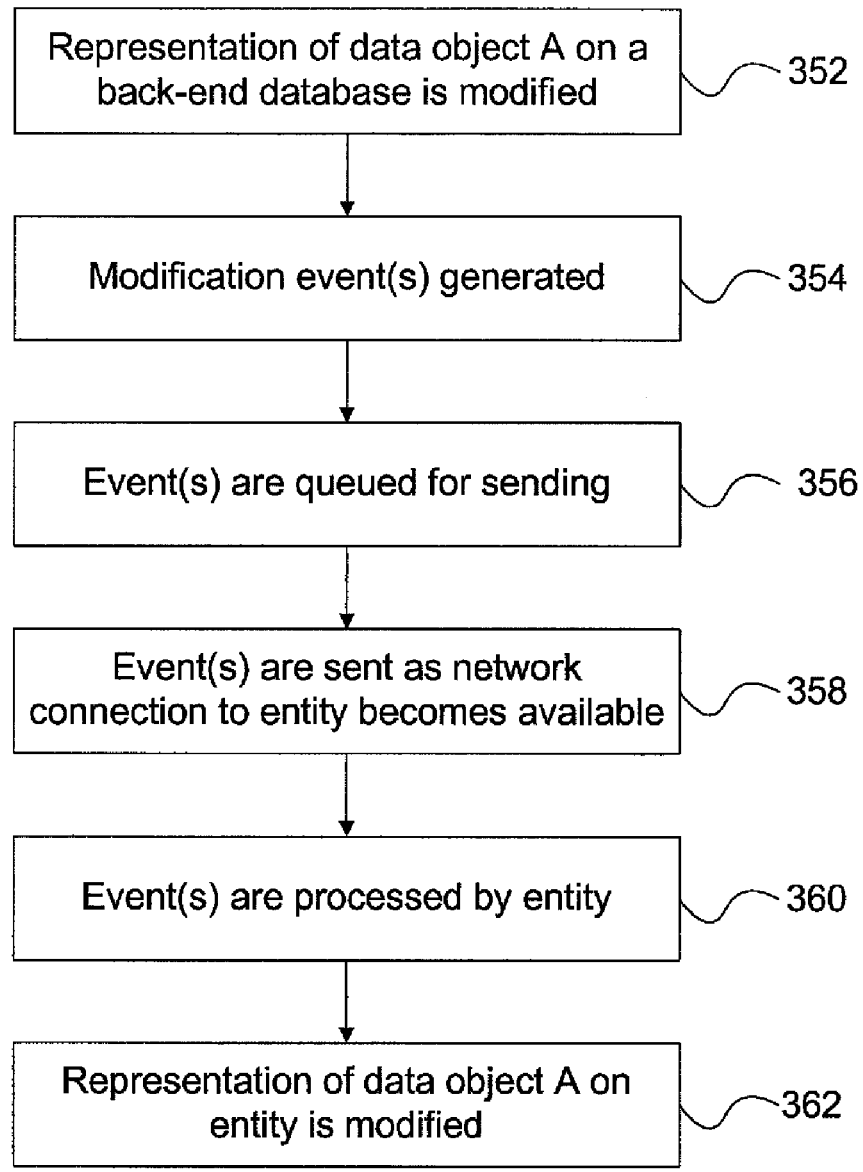
FIG. 3B is flowchart relating to another embodiment of modification and delivery of data objects.

In FIG. 3B, a flowchart 350 illustrates another embodiment of the process of FIG. 3A, where additional detail is provided for illustrative purposes.

In step 352, a representation of data object A on a back-end database is modified. In one embodiment, the back-end database can be one or more of providers 128 of FIG. 1A. In another embodiment, the back-end data store can be database module 126 and/or one or more of database modules 146a-b and/or database module 150.

In step 354, one or more modification events are generated in accordance with the modification to data object A. In one embodiment, the modification events are generated in server communication module 114. In another embodiment, the modification events are generated in client communications modules 110a-110c.

In step 356, the modification events are queued for sending. In one embodiment, the modification events can be queued in the database modules 126, 146A, 146B, and/or 150. In another embodiment, they are queued in a buffer, such as a first-in first-out (FIFO), by the controller 404.

In step 358, the modification events are sent to the entity (or entities) when a network connection to the entity becomes available. In an embodiment, this is done using the push mode of communication. In one embodiment, the network corresponds to communication media 120*a-c*. As described elsewhere herein, the communications media 120*a-c* include, but are not limited to, wired and wireless mediums, such as telephone lines, radio frequency communication, optical networks, or the like.

In step 360, the modification events are processed by the entity. In one embodiment, the communication modules 114, and/or one or more of communication modules 110*a-c* process the modification events.

In step 362, the representation of data object A on the entity is modified.

Dynamic Mobility Embodiments

Figure 4:
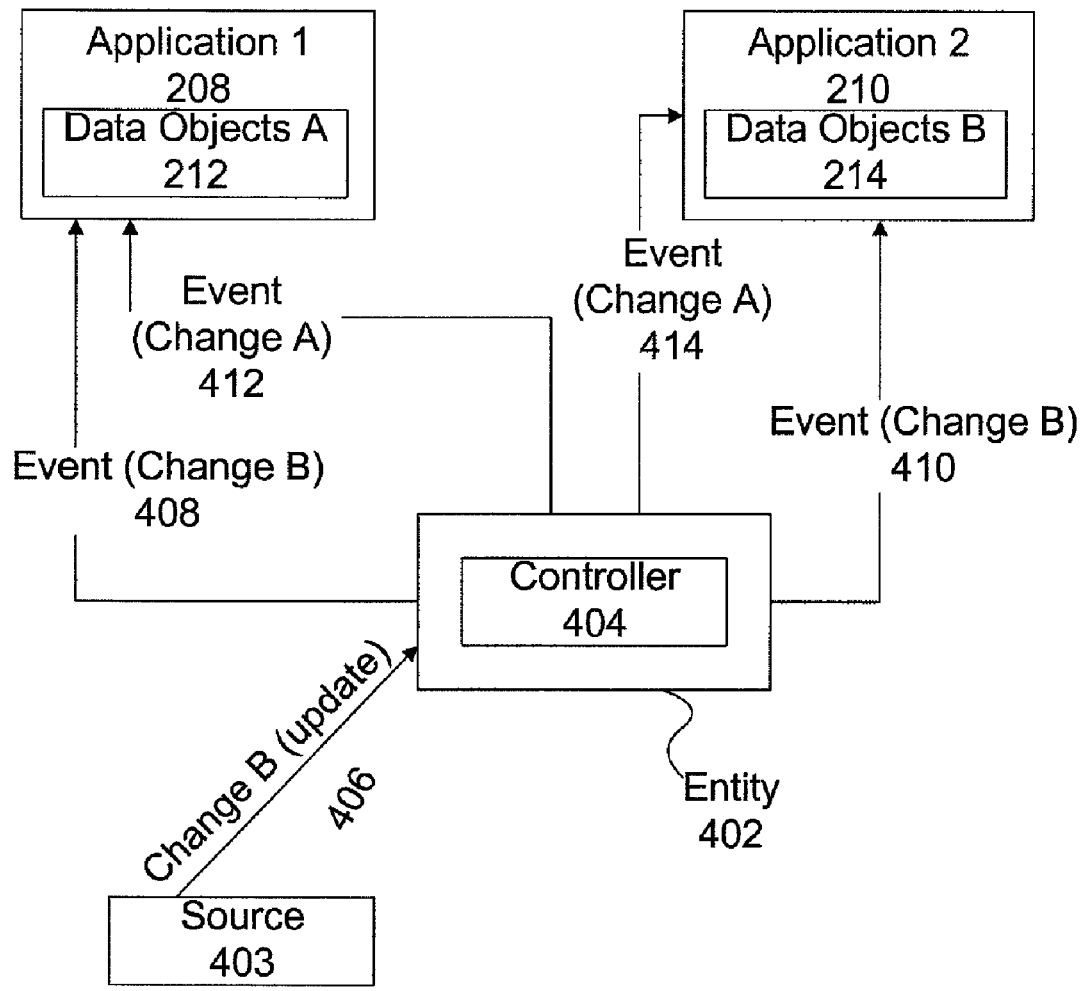
FIG. 4 is a block diagram illustrating another embodiment of the present invention.

In FIG. 4, a block diagram, illustrating another embodiment of the present invention, is shown. Entity 402, including controller 404, is coupled via a communications medium to source 403, application 1 208 and application 2 210. Source 403 sends a modification event 406 to the entity 402. Then the controller 404 forwards (pushes) the modification event to application 1 208 as event 408 and to application 2 210 as event 410. Application 1 208 then applies the modification to data objects A 212. Similarly, application 2 210 applies the modification to data objects B 214. An event 412 can be received from an external source. Event 412 is forwarded simultaneously to application 1 208 and to entity 402. Controller 404 then forwards the event to application 2 210.

In one embodiment, source 403 is a news server and change B 406 is updated news. Entity 402 with controller 404 thereby provides applications 1 208 and 2 210 with updated news.

In another embodiment, source 403 is a corporate server delivering application updates and/or upgrades.

In yet another embodiment, source 403 is a messaging server providing e-mail, voice mail, and/or paging messages.

In these embodiments, applications 1 208 and 2 210 may be on one or more devices, as described herein, such as a cellular phone, a laptop computer, a server, a PDA, and/or a back-end data store. In addition, applications 1 208 and 2 210 can correspond to more than one user.

While the embodiments shown in FIG. 4 show two applications, one skilled in the relevant art[s], based on the teachings herein, could implement the present invention in more than two applications, delivering events to some or all applications.

As shown in FIG. 4, the event 412 occurring externally to source 403 and entity 402 is delivered to application 1 208 and entity 402. For example, regional data changes, sales force numbers, or other information is delivered to application 2 via entity 402.

Figure 5:
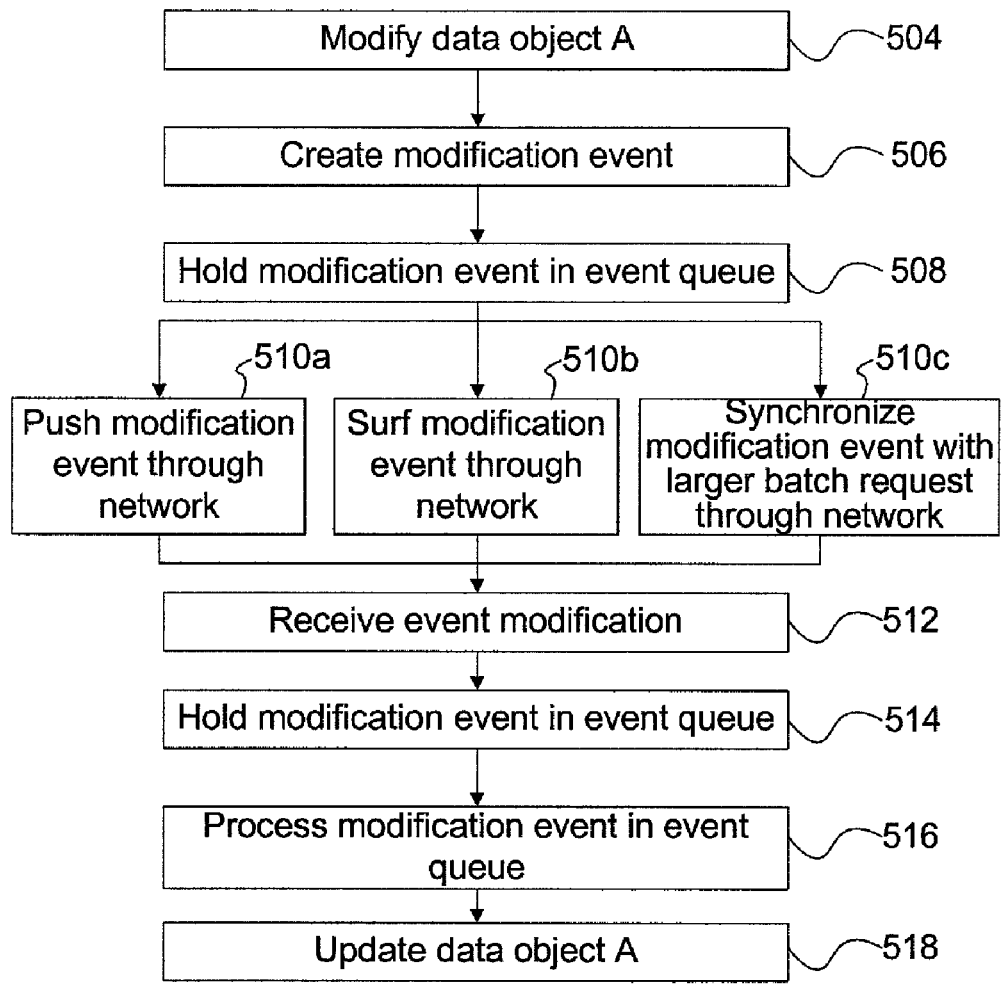
FIG. 5 is a flowchart showing the modification and delivery of similar data objects via a communications medium using various modes of communication according to an embodiment of the present invention.

In FIG. 5, a flowchart 502, showing the modification and delivery of similar data objects via a communications medium using various modes of communication (sync, surf, and/or push) according to an embodiment of the present invention, is shown.

In step 504, data object A is modified. In one embodiment, data object A is modified by the actions of a user, such as changing or adding a telephone number to a contact or an appointment to a calendar. In another embodiment, data object A is modified by a source of data objects such as a web-site delivering stock quotes or pricing information or the like. As described herein, data object A can reside on an entity with the ability to communicate with the other components of the present invention.

In step 506, a modification event is created. In one embodiment, the detection of a change to a data object, such as data object A, results in the construction of a modification event containing information about the modification and/or addition. In one embodiment, the modification event can be created by the server communications modules 110*a-c*, and/or 114. In another embodiment, the modification event can be constructed by a controller, as shown in FIG. 4. The logic of such a controller can be instantiated by the components of the server 104 and/or devices 108*a-b*, and 118. In one embodiment, the modules of these components operate to construct the modification event.

In step 508, the modification event is optionally held in an event queue. In one embodiment, the modification event is held in a buffer, such as a first-in first-out (FIFO), by the controller 404. In another embodiment, the modification event is held by the communications modules of FIG. 1A. The modification event can be optionally held so that the system of the present invention can determine which of steps 510*a-c* (representing modes of communication) are to be utilized. In one embodiment, more than one of the steps 510*a-c* are utilized. Alternatively, only one of the steps 510*a-c* is utilized (in other words, any combination of steps 510*a-c* is possible). In proceeding to steps 510*a-c*, the modification events are forwarded from the queue or directly from creation/construction to the one or more network connections.

In step 510*a*, the modification event is pushed through a network. As described elsewhere herein, the push feature of the present invention involves the delivery of modification events, regardless of source, to one or more destinations (i.e., devices, or other components) based upon determined factors such as availability, subscription, device type, user preferences, administrator preferences, and the like. Events are pushed according to the embodiments described herein with the components of the present invention receiving representations of the data objects to be modified from the received modification events.

Alternatively or in conjunction, in step 510*b*, the modification event is surfed through a network. As described elsewhere herein, the surf feature of the present invention involves the delivery of modification events based on data object requests received from a particular device or group of devices or the user. Modification events are surfed to a device based upon that devices request to have the related representations of data objects updated. In other words, the modification event is maintained and only sent to a particular entity when so requested by the entity.

It is noted that the invention's surf mode of communication is not limited to modification events generated as just described. According to embodiments, an entity can request any object or update, and the invention will retrieve and forward that object/update to the entity (although such action may involve processing of flowchart 502 starting from step 504).

Alternatively or in conjunction, in step 510*c*, the modification event is synchronized, along with a larger batch request, through a network. As described elsewhere herein, the synchronization feature of the present invention involves the delivery of modification events within a larger batch delivery of information to the device and/or component when connectivity is established. In one embodiment, a device will function independent of any network, or in off-line mode, and connect to the network only periodically. During such connection periods, which can be instantiated through an adapter or cradled, the device is able to received all outstanding and pending updates and modification events to bring the representations of data objects located on the devices into "sync" with those of the system of the present invention.

In step 512, the modification event is received by the device or component connected to the network.

In step 514, the modification event is held in an event queue on the device or component of the system. In one embodiment, the device may hold all pending modification events prior to processing in step 516, so that back-up operations or verification functions can be instantiated. In another embodiment, the component of the system can be another controller, similar to controller 404, or a communications module of adapter 118 of FIG. 1A. In such embodiment, the modification events are held until they can be forwarded to other devices and/or components.

In step 516, the modification event in the event queue is processed. In one embodiment, the controller 404 processes the modification events pending in the queue. In another embodiment, other modules of the components of the system and/or devices of the present invention process the modification events.

In step 518, the data object A is updated by the processing of step 516.

Figure 6:
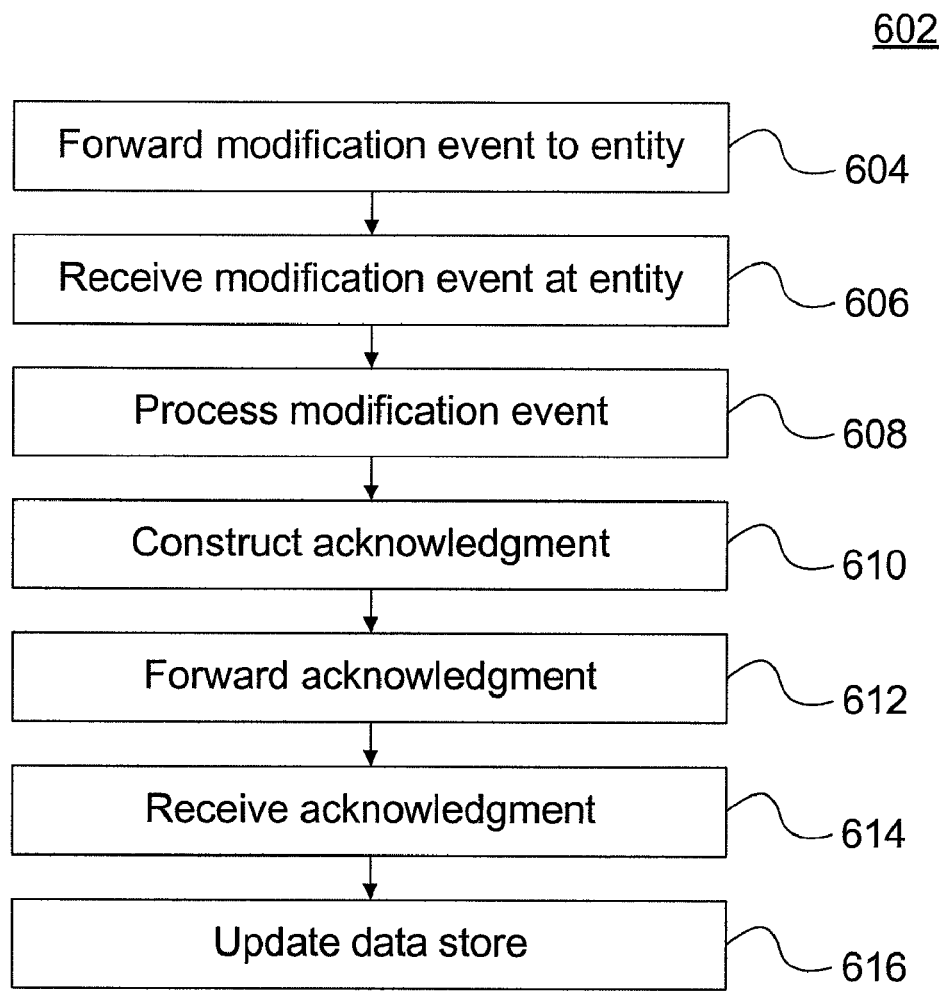
FIG. 6 is a flowchart showing the acknowledgement of delivery of similar data objects via a communications medium using various modes of communication according to another embodiment of the present invention.

In FIG. 6, a flowchart 602, showing the acknowledgement of delivery of similar data objects via a communications medium using various modes of communication according to another embodiment of the present invention, is shown.

In step 604, a modification event is forwarded to an entity. As described elsewhere herein, modification events are forwarded to components of the system, including entities as described in FIGS. 2A and 2B. The description of the process 602 is made with respect to entities, but this is not intended to limit the application of process 602 to entities. As one skilled in the relevant art(s) would recognize, process 602 can be applied to other components of the system of the present invention.

In step 606, the modification event is received at the entity, as described, for example, with respect to FIG. 5.

In step 608, the modification event is processed, as described, for example, with respect to FIG. 5.

In step 610, an acknowledgment is constructed by the entity receiving the modification event. In one embodiment, the controller 404 of the entity receiving the modification event constructs an acknowledgement, wherein the acknowledgement includes information detailing the successful processing of the modification event. In another embodiment, other components and/or modules of the device construct the acknowledgement.

In step 612, the acknowledgment is forwarded via the network to the source of the modification event and/or to a determined destination for acknowledgements.

In step 614, the acknowledgment is received.

In step 616, a data store is updated so that the source of the modification events does not send the same modification events to the same devices more than is needed or preferred.

Figure 7:
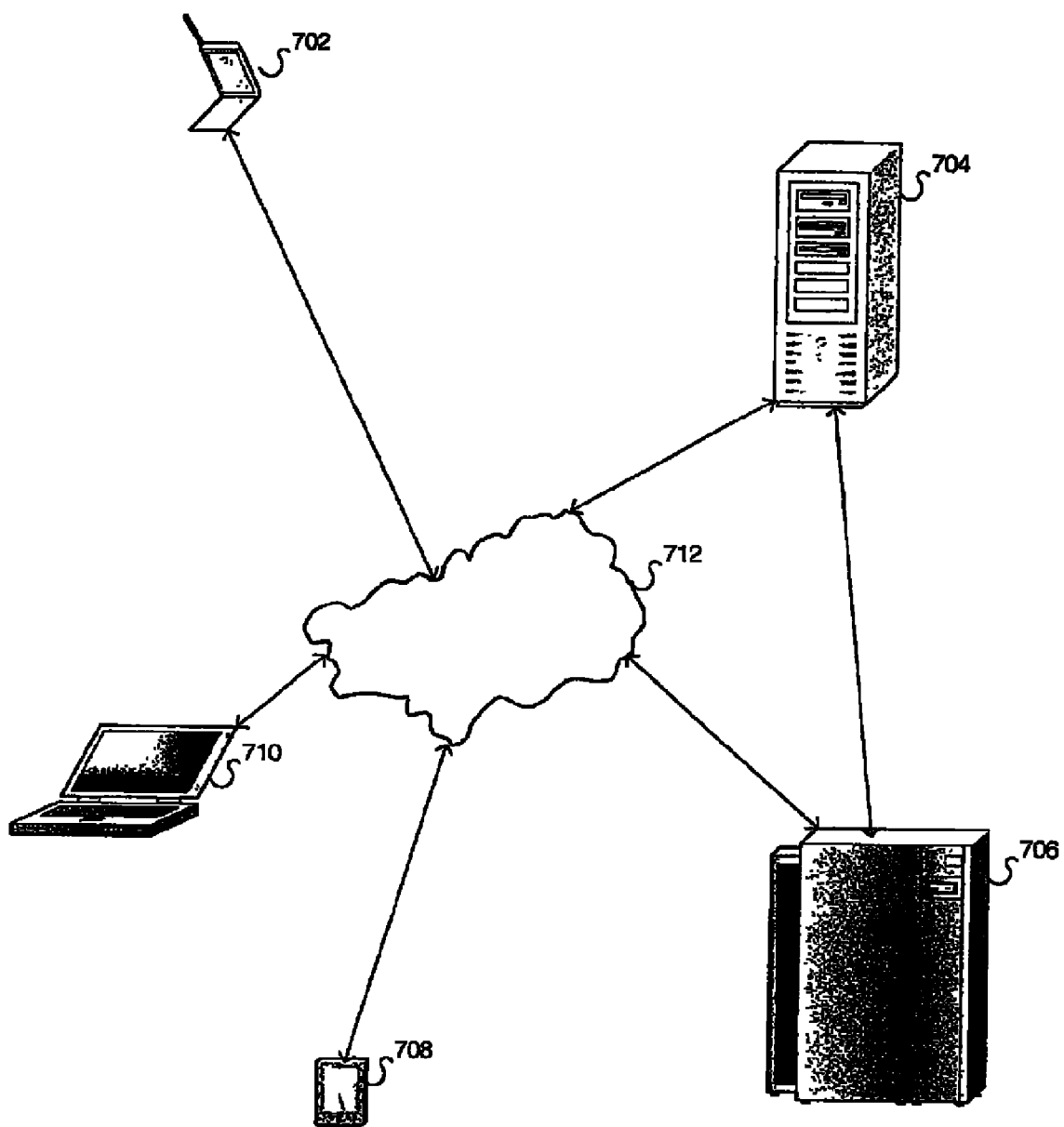
FIG. 7 is a block diagram illustrating some of the components and/or devices upon which the entities described in the embodiments herein can be implemented.

In FIG. 7, a block diagram, illustrating some of the components and/or devices upon which the entities described in the embodiments herein can be implemented, is shown. A cellular phone 702 is coupled to communication media 712. Similarly coupled to communications media 712 are a laptop computer 710, a PDA 708, a server 704 and a back-end data store 706. Back-end data store 706 can be alternatively coupled to server 704. Embodiments describing specific applications of the present invention are included below and refer to components of FIG. 7. The control logic and/or modules implemented on these components enable the features and functions of the present invention.

Figure 8:
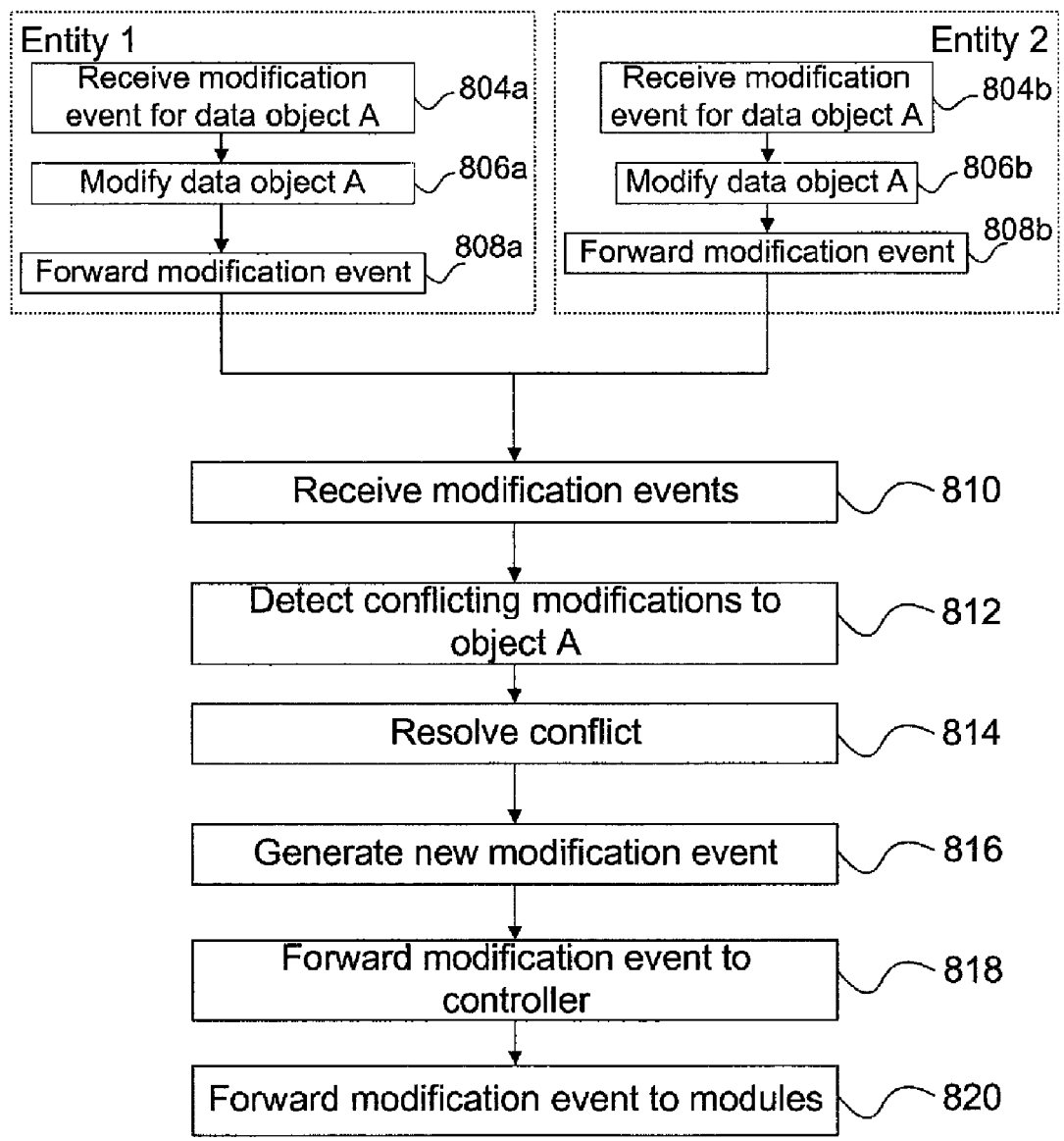
FIG. 8 is a flowchart showing the modification and delivery of similar data objects via a communications medium using various modes of communication according to another embodiment of the present invention.

In FIG. 8, a flowchart 802, showing the modification and delivery of similar data objects via a communications medium using various modes of communication according to another embodiment of the present invention, is shown.

In step 804*a*, a modification event for object A is received at entity 1.

In step 806*a*, object A is modified in entity 1, pursuant to the modification event.

In step 808*a*, the modification event is forwarded to the controller or modules with controller logic through a network.

Similarly, in step 804*b*, a modification event for object A is received at entity 2.

In step 806*b*, object A is modified in entity 2 according to the modification event.

In step 808*b*, the modification event is forwarded to the controller or modules with controller logic through a network.

In step 810, the modification events are received from entities 1 and 2 by the controller.

In step 812, a conflict between modifications to object A (performed at entity 1 and entity 2) is detected by the controller.

In step 814, the conflict is resolved based on preferences indicating a priority for each entity. In one embodiment, the priorities can be based on time of modification, user or administrator, platform, or similar parameters.

In step 816, a new modification event related to object A (or any other objects as needed to resolve the conflict) is generated to resolve the conflict at the entities without the data object corresponding to the modification event with the highest priority.

In step 818, the modification event generated in step 816 is forwarded to the controller.

In step 820, the modification event is forwarded to one or more modules within the entities, such as entities 1 or 2.

Application Embodiments

The present invention is discussed below in several application specific embodiments. In some of these embodiments, the figures described above are referenced for illustrative purposes only and are not intended to limit the present invention. The invention is applicable to a wide and diverse range of applications. Thus, the applications below are presented for illustrative purposes only and are not limiting.

Data Processing Application Embodiment

Data objects A are processed by Application 1 in Entity 1, and data objects B are processed by Application 2 in Entity 2. In an embodiment, an entity is any data communication and/or data processing device. In practice, both Applications 1 and 2 may be contained in the same entity or in different entities. Applications 1 and 2 may be the same (especially in the case where Entities 1 and 2 are different), similar, or different. In other words, Applications 1 and 2 may be any applications that are capable of processing, accessing, or otherwise supporting or interacting with data objects of data object type X.

A Change A can be made to data objects A. Also, a Change B can be made to data objects B. These changes can be made in any way. For example, and without limitation, they may have been made by actions that the user took while working with Application 1, or they could have been made via receipt by Application 1 of some object or objects (such as receiving information over the Internet).

In an embodiment, data objects A and data objects B are representations of the same object. For example, and without limitation, data objects A and data objects B may be representations of a user's calendar. Entity 1 may be the user's PDA and Entity 2 may be the user's desk top computer. In an embodiment, the user would like both representations of his calendar to be the same. Thus, the user would like any changes to data objects A to also be made to data objects B, and vice versa. This is represented by change A and change B.

This embodiment of the present invention is directed to a protocol involving sets of objects, where changes made to some of the objects are also made to the other objects. According to an embodiment of the invention, when a change is made to some of the objects, one or more events are generated that cause the other objects to be similarly changed. Such events may be any communication object, such as but not limited to interrupts, email messages, etc. In an embodiment, the generation and distribution of such events occur without any user interaction, such that synchronization of the objects is maintained in a user transparent manner.

This embodiment of the invention, where an event is generated and communicated to Application 2 relating to Change A made to Data Objects A.

In an alternative embodiment, FIG. 3 is can be described as a flowchart 302 representing the operation of the invention according to an example embodiment.

In step 304, a modification is made to Data Objects A of Type X.

In step 306, one or more events are generated that are representative of this modification. In an embodiment, such events are implemented as email messages. Information regarding the modification is stored in the body or as an attachment of the email messages.

In step 308, the events are communicated in any well known manner to other applications and/or other entities that process, access, support, or otherwise interact with data objects of Type X. In some embodiments, it may be necessary for such applications/entities to have previously been registered so as to receive such events. In the embodiment where the events are email messages, such messages are emailed to such entities/applications. The events may be communicated via any medium, including both wired and wireless, and via any protocol.

In step 310, the events are processed by the recipients of the events. For example, in the case where the events are email messages, the application would receive the email. Upon parsing through the email message, the application would realize that the email was contained instructions for modifying data objects. The application would then modify the data objects as instructed in the email message.

As shown in FIG. 4, in an alternative embodiment, the functionality described above is achieved by a controller 404. In an embodiment, the controller 404 resides at a server 402, instead of an entity 402, but the invention is not limited to this embodiment. For example, and without limitation, the server 402 may completely or partially reside at entities 104, 106. FIG. 4 shall be further described below, in the alternative, with respect to an email use embodiment.

The present invention shall further be described by considering a number of application embodiments. For each of the embodiments, the same technology is used to achieve the purposes and functions of the invention.

Use Application Embodiment

Referring to FIG. 4 in an alternative embodiment, assume that Data Objects A and Data Objects B are email messages, and Change A represents an email related change. For example, Change A may be an email that was transmitted by a user, or an email that was received, or an email that was deleted, or an email that was put into a folder, or an email that was stored to disk, etc.

Change A will change Data Objects A. It is desired that Change A similarly change Data Objects B.

According to an embodiment of the invention, information regarding Change A is communicated to controller 404. For example, in the case where Change A is an email sent by a user of Application 1, the controller 404 will receive the email.

The controller 404 generates an event 414 representative of Change A, and transmits that event 414 to Application 2. In an embodiment, event 414 is an email message.

Upon receipt and review of this email message, the Application 2 realizes that it is not in fact an email message that is intended to be read by a user. Instead, Application 2 realizes that this email is an event directed to updating Data Objects B. Accordingly, Application 2 so modifies Data Objects B.

Web Use Application Embodiment involving Commuter Information

Referring to FIG. 4, assume that Data Objects A and Data Objects B are HTML pages that graphically depict commuting information. For example, this may comprise a route from a user's home to her business (which the user previously defined), and places along this route where there are delays in the commute.

The user would like this information to be updated so as to be as real-time as possible, so that the user may change her route as she travels to and from work. Change A represents updated traffic information. For example, Change A may be an accident along the route, construction along the route, the removal of an accident, congestion along the route, weather along the route, etc.

Traffic information may be available from a source. Periodically, the controller 404 receives updates from the source, such as Change B 406. The source may automatically send this information to the controller 404, or the controller 404 may periodically access (such as poll) the source.

The controller 404 generates an event 408 representative of Change B, and transmits that event 408 to Application 1. In an embodiment, event 408 is an email message.

Upon receipt and review of this email message, the Application 1 realizes that it is not in fact an email message that is intended to be read by a user. Instead, Application 1 realizes that this email is an event directed to updating Data Objects A. Accordingly, Application 1 so modifies Data Objects A. In this example, such updates may be communicated via the push mode (where the information is sent to the user based on previously provided preference information, for example), or the surf mode (where the user requests specific information on traffic).

Example Computer Environment

Figure 9:
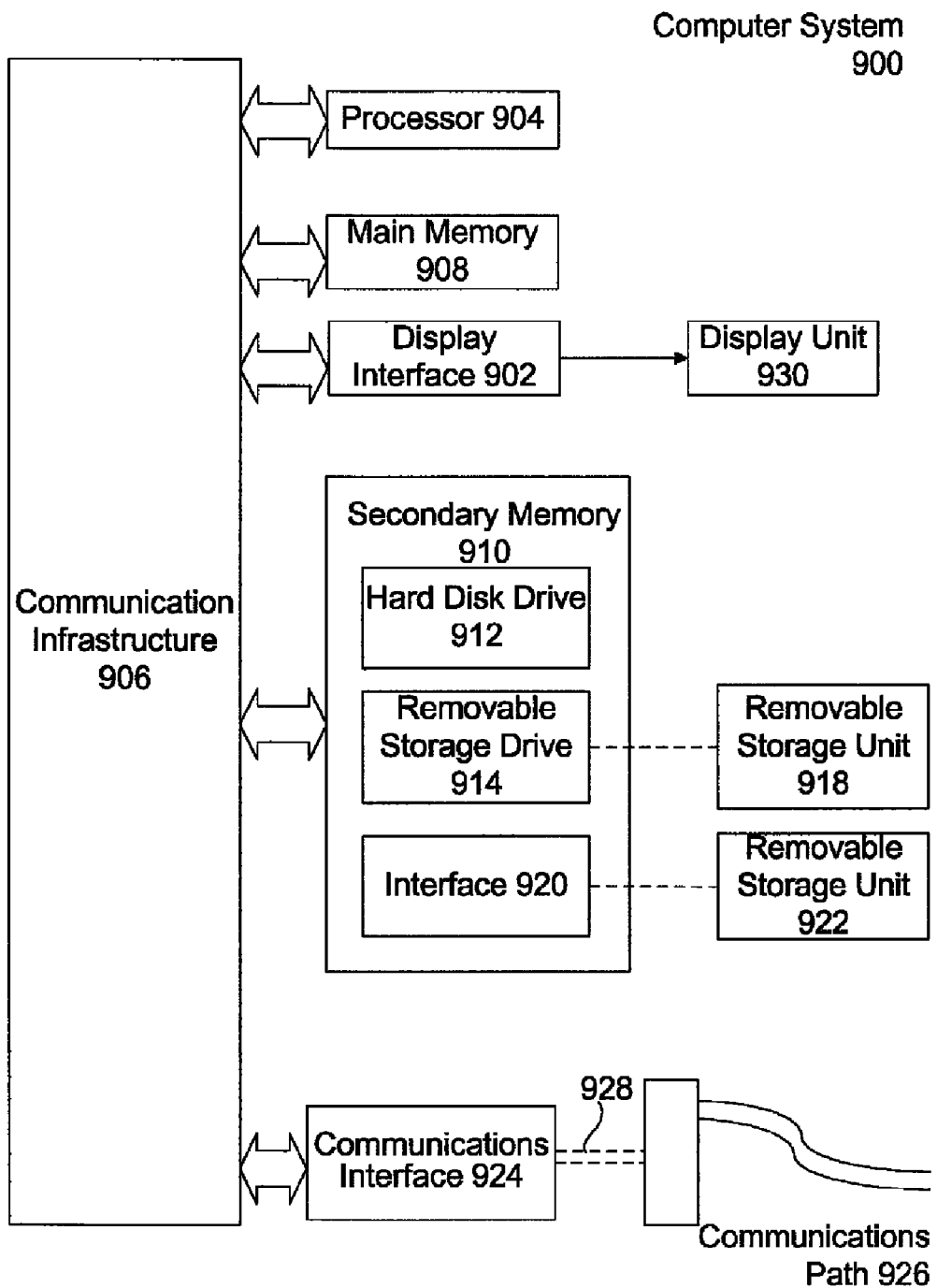
FIG. 9 is a block diagram of an exemplary computer system useful for implementing the invention.

The present invention (i.e., the devices, servers, entities, and systems described herein or any part thereof) may be implemented and/or emulated using hardware, software or a combination thereof and may be implemented in one or more computer systems or other processing systems. In fact, in one embodiment, the invention is directed toward one or more computer systems capable of carrying out the functionality described herein. An example of a computer system 900 is shown in FIG. 9. The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 900 can include a display interface 902 that forwards graphics, text, and other data from the communication infrastructure 906 (or from a frame buffer not shown) for display on the display unit 930.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCMCIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path (i.e., channel) 926. This channel 926 carries signals 928 and may be implemented using wire or cable, fiber optics, a phone line, a cellular phone link, an RF link and other communications channels.

In this document, the terms "computer program medium" and "computer usable medium" are used to generally refer to media such as removable storage drive 914, a hard disk installed in hard disk drive 912, and signals 928. These computer program products are means for providing software to computer system 900. The invention is directed to such computer program products.

Computer programs (also called computer control logic) are stored in main memory 908 and/or secondary memory 910. Computer programs may also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Overview of Embodiments

Accordingly, as described herein, the invention has a number of embodiments. These embodiments are summarized below. These embodiments are described in detail above, and aspects of these embodiments are further described in the applications cited above.

1. A method for delivering information to an entity, comprising the steps of: (1) identifying a data object to be delivered to the entity; and (2) delivering said data object to the entity, comprising one or more of steps (a)-(c): (a) pushing said data object to the entity; (b) transferring said data object to the entity during a sync operation; and (c) transferring said data object to the entity in response to a request from said entity while said entity is surfing.

2. The method of claim 1, wherein step (2a) comprises the steps of: (i) creating a modification event representative of said data object; and (ii) sending said modification event to said entity.

3. The method of claim 2, wherein said entity processes said modification event.

4. The method of claim 1, wherein step (2b) comprises the steps of: (i) accessing providers for information using state information maintained on behalf of said entity; (ii) receiving said information from said providers, wherein said information comprises said data object; and (iii) sending said information to said entity.

5. The method of claim 1, wherein step (2c) comprises the steps of: (i) identifying one or more modification events representative of said data object, wherein said data object is associated with a said request from said entity while said entity is surfing; and (ii) sending said modification events to said entity.

6. The method of claim 1, wherein step (2c) comprises the steps of: (i) accessing providers for information based on said request from said entity while said entity is surfing; (ii) receiving said information from said providers, wherein said information comprises said data object; and (iii) sending said information to said entity.

7. The method of claim 1, wherein step (2a) is performed.

8. The method of claim 1, wherein step (2b) is performed.

9. The method of claim 1, wherein step (2c) is performed.

10. The method of claim 1, wherein steps (2a) and (2b) are performed.

11. The method of claim 1, wherein steps (2a) and (2c) are performed.

12. The method of claim 1, wherein steps (2b) and (2c) are performed.

13. The method of claim 1, wherein steps (2a), (2b) and (2c) are performed.

14. A method for delivering information to an entity, comprising the steps of: (1) identifying a data object to be delivered to the entity; and (2) delivering said data object to the entity, comprising the step of pushing said data object to the entity.

15. The method of claim 14, wherein step (2) comprises the steps of: (i) creating a modification event representative of said data object; and (ii) sending said modification event to said entity.

16. A method for delivering information to an entity, comprising the steps of: (1) identifying a data object to be delivered to the entity; and (2) delivering said data object to the entity, comprising the step of transferring said data object to the entity during a sync operation.

17. The method of claim 16, wherein step (2) comprises the steps of: (i) accessing providers for information using state information maintained on behalf of said entity; (ii) receiving said information from said providers, wherein said information comprises said data object; and (iii) sending said information to said entity.

18. A method for delivering information to an entity, comprising the steps of: (1) identifying a data object to be delivered to the entity; and (2) delivering said data object to the entity, comprising the step of transferring said data object to the entity in response to a request from said entity while said entity is surfing.

19. The method of claim 18, wherein step (2) comprises the steps of: (i) accessing providers for information using state information maintained on behalf of said entity; (ii) receiving said information from said providers, wherein said information comprises said data object; and (iii) sending said information to said entity.

20. The method of claim 18, wherein step (2) comprises the steps of: (i) identifying one or more modification events representative of said data object, wherein said data object is associated with a said request from said entity while said entity is surfing; and (ii) sending said modification events to said entity.

21. A method for delivering information to an entity, comprising the steps of: (1) generating one or more modification events representative of a modification made to a data object; and (2) forwarding said modification events to an entity identified as a recipient of said modification events, wherein said entity processes said modification events.

22. The method of claim 21, wherein said data object is stored at said entity, and wherein said entity processes said modification events so as to update said data object.

23. The method of claim 21, wherein step (2) is performed during a push operation.

24. The method of claim 21, wherein step (2) is performed during a sync operation.

25. The method of claim 21, wherein step (2) is performed during a surf operation.

26. The method of claim 21, wherein step (2) is performed during at least one of a push operation, a sync operation, and a surf operation.

27. A method for receiving and processing information by an entity, comprising the steps of: (1) receiving a data object, comprising one or more of steps (a)-(c): (a) receiving said data object via a push operation; (b) receiving said data object via a sync operation; and (c) receiving said data object via a surf operation; and (2) processing said data object.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-implemented method for receiving information at a first device, comprising:

storing a first data object on the first device in a first device-specific representation;

receiving a batch of information in response to the first device transitioning from an off-line state to an online state, wherein the batch of information includes a first modification event, a content of the batch having been determined based at least on a state of data stored on the first device, the first modification event having been generated based on at least a modification made to a second data object stored at a second device in a second device-specific representation, wherein the batch of information was transmitted by a third device, the third device being different from the second device, and wherein the first modification event was generated by the third device by resolving a conflict between a second modification event generated by the second device representative of the modification made to the second data object and a third modification event representative of a modification made to a third data object on a fourth device;

processing the first modification event to recover the modification;

updating the first data object based on the recovered modification; and transmitting an acknowledgement indicating that the first modification event was successfully processed by the first device.

2. The method of claim 1, wherein the first modification event comprises an email.

3. The method of claim 2, wherein said processing comprises:

parsing the email to recover the first modification event.

4. The method of 3, wherein the first modification event is included in an attachment to the email.

5. The method of claim 1, further comprising:

queuing the first modification event in a buffer.

6. A computer system for receiving information at a first device, comprising:

a storage for storing a first data object on the first device in a first device-specific representation;

a module configured to receive a batch of information in response to the first device transitioning from an off-line state to an online state, wherein the batch of information includes a first modification event, a content of the batch having been determined based at least on a state of data stored on the first device, the first modification event having been generated based on at least a modification made to a second data object stored at a second device in a second device-specific representation, wherein the batch of information was transmitted by a third device, the third device being different from the second device, and wherein the first modification event was venerated by the third device by resolving a conflict between a second modification event generated by the second device representative of the modification made to the second data object and a third modification event representative of a modification made to a third data object on a fourth device;

a module configured to process the first modification event to recover the modification;

a module configured to update the first data object based on the recovered modification; and a module configured to transmit an acknowledgement indicating that the first modification event was successfully processed by the first device.

7. The computer system of claim 6, wherein the first modification event comprises an email, further comprising:

a module configured to parse the email to recover the first modification event.

8. The computer system of claim 6, further comprising:

a module configured to queue the first modification event in a buffer.

9. A non-transitory computer program product storing one or more sequences of one or more instructions for execution by one or more processors to perform a method for processing memory requests, the instructions when executed by the one or more processors, cause the one or more processors to:

store a first data object on the first device in a first device-specific representation;

receive a batch of information in response to the first device transitioning from an off-line state to an online state, wherein the batch of information includes a first modification event, a content of the batch having been determined based at least on a state of data stored on the first device, the first modification event having been generated based on at least a modification made to a second data object stored at a second device in a second device-specific representation, wherein the batch of information was transmitted by a third device, the third device being different from the second device, and wherein the first modification event was generated by the third device by resolving a conflict between a second modification event generated by the second device representative of the modification made to the second data object and a third modification event representative of a modification made to a third data object on a fourth device;

process the first modification event to recover the modification;

update the first data object based on the recovered modification; and transmit an acknowledgement indicating that the first modification event was successfully processed by the first device.

10. The computer program product of claim 9, wherein the first modification event comprises an email.

11. The computer program product of claim 9, further comprising the processor to:

queue the first modification event in a buffer.

* * * * *